United States Patent
Deno et al.

(10) Patent No.: US 11,358,225 B2
(45) Date of Patent: Jun. 14, 2022

(54) MACHINE TOOL

(71) Applicant: STAR MICRONICS CO., LTD., Shizuoka (JP)

(72) Inventors: Masatoshi Deno, Shizuoka (JP); Shin Ito, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 0 days.

(21) Appl. No.: 17/032,230

(22) Filed: Sep. 25, 2020

(65) Prior Publication Data
US 2021/0008631 A1  Jan. 14, 2021

Related U.S. Application Data (63) Continuation of application No. PCT/JP2018/048027, filed on Dec. 27, 2018.

(30) Foreign Application Priority Data

Apr. 16, 2018 (JP) .............................. JP2018-078372

(51) Int. Cl.
*B23B 3/24* (2006.01)
(52) U.S. Cl.
CPC ..................... *B23B 3/24* (2013.01)
(58) Field of Classification Search
CPC ............... B23B 3/24; B23B 3/06; B23Q 1/01; B23Q 1/012; B23Q 1/015; B23Q 1/017;
(Continued)

(56) References Cited

U.S. PATENT DOCUMENTS

| RE31,288 | E | | 6/1983 | Matsuzaki et al. |
| 4,530,251 | A | * | 7/1985 | Henle ................... B23Q 5/408 74/89.36 |
| 4,561,814 | A | * | 12/1985 | Dahlgren, Jr ........ B23Q 1/0009 408/130 |
| 4,919,001 | A | * | 4/1990 | Ogiwara ................ G02B 21/26 74/10.52 |

(Continued)

FOREIGN PATENT DOCUMENTS

| CN | 1174303 A | 2/1998 |
| CN | 105058074 | 11/2015 |

(Continued)

OTHER PUBLICATIONS

SIPO, Office Action of Application No. 201880085686.5, dated Jul. 23, 2021.

(Continued)

*Primary Examiner* — Nicole N Ramos
(74) *Attorney, Agent, or Firm* — Lex IP Meister, PLLC (57) ABSTRACT

Provided is a lathe capable of facilitating replacement of a ball screw. A machine tool comprises a base, a moving unit, a ball screw, a cap, and a supporting unit provided on the base to support the cap. The cap has a body and a flange expanded larger than the body on the outer side thereof with respect to the axis direction. The supporting unit comprises a recess part which receives the body. The recess part is provided with an opening allowing the threaded shaft to pass in a direction perpendicular to the axis direction in the state that the supporting unit is provided on the base. The supporting unit further comprises a positioning part on which an inner surface of the flange abuts in the axis direction in the state that the body is received in the recess part.

1 Claim, 5 Drawing Sheets

(58) Field of Classification Search
CPC ............ B23Q 1/621; B23Q 1/07; B23Q 5/40;
Y10T 409/307056; Y10T 409/309576
See application file for complete search history.

(56) References Cited

U.S. PATENT DOCUMENTS

| | | | | |
|---|---|---|---|---|
| 5,468,101 | A * | 11/1995 | Shoda | B23Q 1/012 |
| | | | | 108/143 |
| 6,240,796 | B1 | 6/2001 | Yamada | |
| 8,973,453 | B2 * | 3/2015 | Fukano | F16H 25/24 |
| | | | | 74/89.36 |
| 10,293,442 | B2 * | 5/2019 | Chen | B23C 1/06 |
| 2002/0176757 | A1 * | 11/2002 | Saito | B23Q 1/267 |
| | | | | 409/135 |
| 2009/0067941 | A1 * | 3/2009 | Chen | B23Q 5/36 |
| | | | | 408/129 |
| 2013/0239854 | A1 | 9/2013 | Huang et al. | |
| 2016/0193669 | A1 * | 7/2016 | Chen | B23Q 39/023 |
| | | | | 409/203 |

FOREIGN PATENT DOCUMENTS

| | | |
|---|---|---|
| CN | 205904751 | 1/2017 |
| DE | 2739087 | 3/1978 |
| JP | H02-53545 | 2/1990 |
| JP | H05-69352 | 3/1993 |
| JP | H08-118199 | 5/1996 |
| JP | H11-108141 | 4/1999 |
| JP | 2001-219325 | 8/2001 |
| JP | 2005-66716 | 3/2005 |
| JP | 2006-97869 | 4/2006 |
| JP | 2006-118574 | 5/2006 |
| JP | 2006-177421 | 7/2006 |

OTHER PUBLICATIONS

EPO, Supplementary European search Report of Application No. 18915724.1, dated Nov. 16, 2021.
JPO, Office Action of JP 2018-078372 dated Jan. 11, 2022.

* cited by examiner

MACHINE TOOL

CROSS-REFERENCE TO RELATED APPLICATION

The present application is a continuation of PCT Application No. PCT/JP2018/048027, filed on Dec. 27, 2018, which claims priority of Japanese Patent Application No. 2018-078372 filed on Apr. 16, 2018. The contents of this application are incorporated herein by reference in their entirety.

BACKGROUND

(a) Field

The present invention relates to a machine tool provided with a driving mechanism using a ball screw for driving a moving unit.

(b) Description of the Related Art

A machine tool provided with a headstock movably mounted on a bed includes an NC (numerical control) lathe provided with a ball screw having a threaded shaft rotated by a servo motor. One end of the threaded shaft is mounted to a torque transmission mechanism which receives a torque from the servo motor. The other end of the threaded shaft is passed through a through-hole of a supporting member mounted on the bed to be rotatably supported thereby.

Japanese Patent Application Publication No. 2006-97869 discloses a vacuum precision positioning apparatus provided with a linear motion table apparatus in a vacuum chamber. In the linear motion table apparatus, the end of the threaded shaft is rotatably supported via a support unit on an attaching port of a support bracket mounted on a base. An opening of the attaching port of the support bracket faces the base. The attaching port is thereby closed.

SUMMARY

The ball screw is generally replaced after use for a long period. When the ball screw is being removed from the lathe, a ball screw nut is necessarily removed from the headstock to pull out the end of the ball screw off the torque transmission mechanism connected to the servo motor. At the time, the ball screw is necessarily tilted to be drawn toward the servo motor to keep the ball screw nut on the threaded shaft. Then, the supporting member for supporting the other end of the ball screw is necessarily removed from the bed. When a ball screw is being attached to the lathe, the ball screw is necessarily tilted to be inserted to a through-hole for the ball screw nut on the headstock and the other end of the ball screw is necessarily inserted to a through-hole of the supporting member to be supported thereby. The end of the ball screw is then necessarily put into the torque transmission mechanism. Parallelism or mount posture of the ball screw is necessarily checked and adjusted by an operator. The supporting member is necessarily fastened to the bed. Finally, the ball screw is necessarily finely adjusted in position by the operator. Fastening the supporting member to the bed needs a skill and an experience to check and adjust parallelism or mount posture of the ball screw.

The problem resides not only in the NC lathe but in a variety of machine tools. The invention discloses a machine tool capable of facilitating the work of replacing the ball screw.

A machine tool of the invention comprises:
a base,
a moving unit provided with respect to the base movably in a predetermined axis direction,
a ball screw having a nut fixed to the moving unit and a threaded shaft rotated on an axis along the axis direction to move the nut in the axis direction,
a cap which covers an end of the threaded shaft and allows rotation of the threaded shaft on the axis, and
a supporting unit provided on the base to support the cap, wherein the cap has a body and a flange expanded larger than the body on the outer side thereof with respect to the axis direction,
the supporting unit comprises a recess part which receives the body of the cap, the recess part being provided with an opening allowing the threaded shaft to pass in a direction perpendicular to the axis direction in the state that the supporting unit is provided on the base, and
the supporting unit further comprises a positioning part on which an inner surface of the flange abuts in the axis direction in the state that the body of the cap is received in the recess part.

The invention provides a machine tool capable of facilitating the work of replacing the ball screw.

DETAILED DESCRIPTION

Hereinafter, an embodiment of the present invention will be described. The invention is not limited to the exemplary embodiment and the features disclosed herein are not necessarily essential to the invention.

(1) Summary of Inventive Technology

Technology of the invention will be described with reference to FIG. 1 to FIG. 7. The drawings only schematically show an example of the invention. They may have a mismatch to each other due to different magnification in each direction. Each element denoted by a symbol is only an example.

Embodiment 1

A machine tool (a lathe 1) of an embodiment of the invention may comprise a base 5, a moving unit 6 provided with respect to the base 5 movably in a predetermined axis direction D1, a ball screw 7, a cap 8, and a supporting unit 9. The ball screw 7 may comprise a nut 7n fixed to the moving unit 6 and a threaded shaft 7s rotated on an axis AX0 along the axis direction D1 to move the nut 7n in the axis direction D1. The cap 8 may cover an end 72 of the threaded shaft 7s and allows rotation of the threaded shaft 7s on the axis AX0. The supporting unit 9 may be provided on the base 5 to support the cap 8. The cap 8 may comprise a body 81 and a flange 85 expanded larger than the body 81 on the outer side D1o thereof with respect to the axis direction D1. The supporting unit 9 may comprise a recess part 95 which receives the body 81 of the cap 8. The recess part 95 may be provided with an opening 96 allowing the threaded shaft 7s to pass in a direction D2 perpendicular to the axis direction D1 in the state that the supporting unit 9 is provided on the base 5. The supporting unit 9 may further comprise a positioning part 91 on which an inner surface 86 of the flange 85 abuts in the axis direction D1 in the state that the body 81 of the cap 8 is received in the recess part 95.

The recess part 95 of the supporting unit 9, which receives the body 81 of the cap 8 covering the end 72 of the threaded shaft 7s, may have the opening 96 allowing the threaded shaft 7s to pass in the direction D2 perpendicular to the axis direction D1 in the state that the supporting unit 9 is provided on the base 5. An operator can fully draw out the ball screw 7 without removing the supporting unit 9 from the base 5 only by readily tilting the threaded shaft 7s toward the opening 96 of the recess part 95. Further, the operator can set a ball screw 7 in a predetermined position without removing the supporting unit 9 from the base 5 only by readily tilting the threaded shaft 7s put in the recess part 95 toward the opening 96. Further, mount posture of the ball screw 7 is readily defined only by covering the end 72 of the threaded shaft 7s with the cap 8, placing the body 81 of the cap 8 in the recess part 95, and letting the inner surface 86 of the flange 85 abut with the positioning part 91 of the supporting unit 9 in the axis direction D1. As described above, the invention eliminates the need of removing the supporting unit 9 from the base 5 during the work of replacing the ball screw. No skill or experience is required to check and adjust mount posture of the ball screw 7. The embodiment provides a machine tool capable of facilitating the work of replacing the ball screw.

The moving unit may comprise a table slidable with a headstock and a table slidable with a tool post. The supporting unit may be a separate member detachably mounted on the base or may be integrally formed with the base. The opening of the recess part of the supporting unit may face an orientation away from the base or an orientation along the base. These remarks may be applicable to the following embodiments.

(2) Hardware Configuration of the Machine Tool

Figure 1:
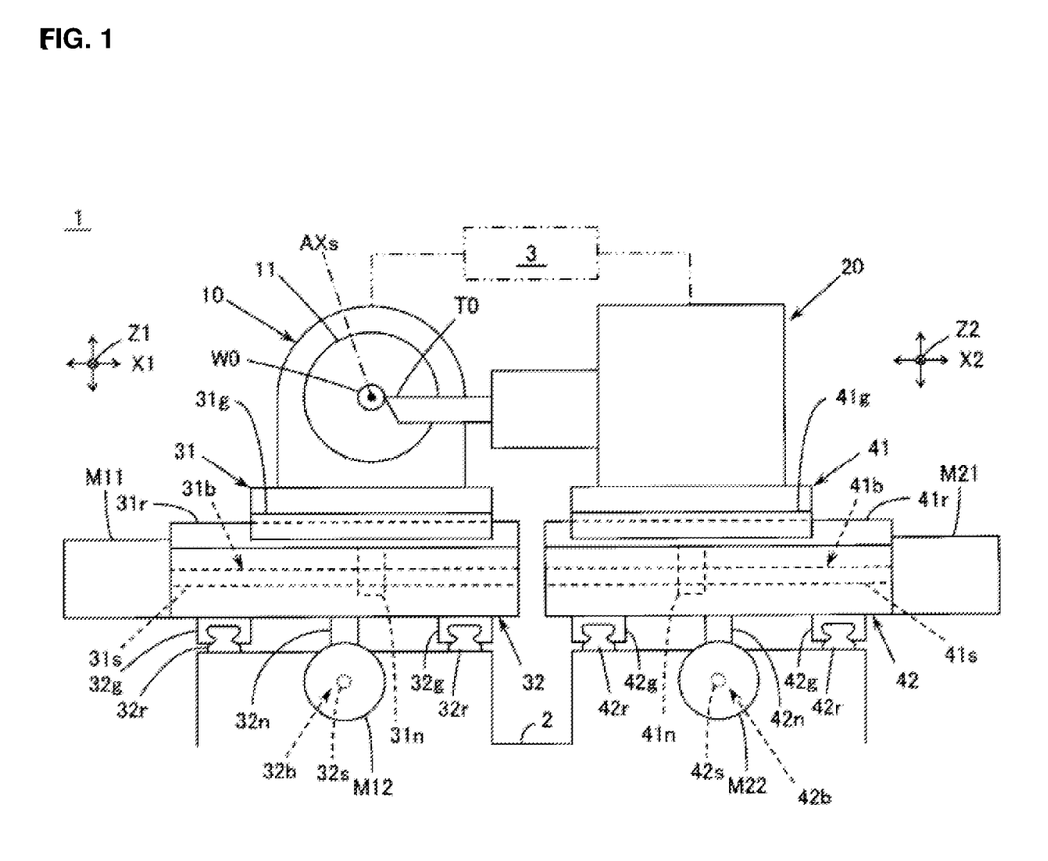
FIG. 1 is a block diagram schematically showing a configuration of a machine tool.

FIG. 1 schematically shows a configuration of an NC (numerical control) lathe 1 of sliding headstock type. FIG. 1 is only a simplified example for explanation and the invention is not limited thereto. A positional relation between elements is only an example for explanation. The left and right direction may be replaced by the up and down direction or the front and back direction. The up and down direction may be replaced by the left and right direction or the front and back direction. The front and back direction may be replaced by the left and right direction or the up and down direction. The rotational direction may be inversed. If something is the same as something in direction or position, they may be the same or almost the same within an error range.

The lathe 1 may comprise a headstock 10 provided with a spindle 11 holding a workpiece W0, a tool post 20 holding a tool T0 cutting the workpiece W0, a headstock driving unit for moving the headstock 10 in an X1-axis direction and a Z1-axis direction, a tool post driving unit for moving the tool post 20 in an X2-axis direction and a Z2-axis direction, and a NC apparatus 3, which may be all mounted on a bed 2. Primary part of the bed 2, the headstock 10, the tool post 20, and the tool T0 may be made of metal. The NC apparatus 3 may comprise a RAM (Random Access Memory) storing an NC program, a ROM (Read Only Memory) storing an interpretive executing program for the NC program, a CPU (Central Processing Unit) executing the interpretive executing program, a timer circuit, and an interface. The NC apparatus 3 may control operation of the headstock 10, the tool post 20, the headstock driving unit, and the tool post driving unit in accordance with the NC program.

The headstock 10 may be movable in the Z1-axis direction along the spindle axis AXs and in the X1-axis direction perpendicular to the Z1-axis direction. The spindle 11 provided on the headstock 10 may releasably hold the cylindrical (bar) workpiece W0 inserted in the Z1-axis direction with a collet (not shown). The workpiece W0 may be rotated on the spindle axis AXs along the longitudinal direction of the workpiece W0.

The tool post 20 may hold one or more tools T0 for cutting the workpiece W0. The tool post 20 may be movable in the X2-axis direction along the X1-axis direction and in the Z2-axis direction along the Z1-axis direction. The tool post may include a turret tool post and a gang tool post.

The headstock driving unit may comprise an X1-axis driving element (an X1-axis motor M11, a ball screw 31b, etc.) which drives an X1-axis direction slide table 31 and the headstock 10 mounted thereon in the X1-axis direction. The headstock driving unit may further comprise a Z1-axis driving element (a Z1-axis motor M12, a ball screw 32b, etc.) which drives a Z1-axis direction slide table 32 and the X1-axis direction slide table 31 mounted thereon in the Z1-axis direction.

The X1-axis direction slide table 31 may have a pair of guides 31g slidably engaged in the X1-axis direction with a pair of rails 31r mounted on the Z1-axis direction slide table 32 as described below. The X1-axis direction slide table 31 may further have a nut 31n detachably mounted thereon. The ball screw 31b is a mechanical component comprising a threaded shaft 31s and the nut 31n operable via balls (not shown). The threaded shaft 31s may be rotated on an axis along the X1-axis direction to move the nut 31n in the X1-axis direction. The X1-axis motor M11 may be a servo motor mounted on the Z1-axis direction slide table 32 to rotate the threaded shaft 31s in response to a command from the NC apparatus 3. The X1-axis direction slide table 31 and the headstock 10 mounted thereon may be driven in the X1-axis direction by the ball screw 31b.

The Z1-axis direction slide table 32 may have a pair of guides 32g slidably engaged in the Z1-axis direction with a pair of rails 32r mounted on the bed 2. The Z1-axis direction slide table 32 may further have a nut 32n detachably mounted thereon. The ball screw 32b is a mechanical component comprising a threaded shaft 32s and the nut 32n operable via balls (not shown). The threaded shaft 32s may be rotated on an axis along the Z1-axis direction to move the nut 32n in the Z1-axis direction. The Z1-axis motor M12 may be a servo motor mounted on the bed 2 to rotate the threaded shaft 32s in response to a command from the NC apparatus 3. The Z1-axis direction slide table 32 and the headstock 10 mounted thereon may be driven in the Z1-axis direction by the ball screw 32b. The X1-axis driving element may be moved in the Z1-axis direction by the Z1-axis driving element. The Z1-axis driving element may be moved in the X1-axis direction by the X1-axis driving element.

The tool post driving unit as shown in FIG. 1 may comprise an X2-axis driving element (an X2-axis motor M21, a ball screw 41*b*, etc.) which drives an X2-axis direction slide table 41 and the tool post 20 mounted thereon in the X2-axis direction. The tool post driving unit may further comprise a Z2-axis driving element (a Z2-axis motor M22, a ball screw 42*b*, etc.) which drives a Z2-axis direction slide table 42 and the X2-axis direction slide table 41 mounted thereon in the Z2-axis direction.

The X2-axis direction slide table 41 may have a pair of guides 41*g* slidably engaged in the X2-axis direction with a pair of rails 41*r* mounted on the Z2-axis direction slide table 42 as described below. The X2-axis direction slide table 41 may further have a nut 41*n* detachably mounted thereon. The ball screw 41*b* is a mechanical component comprising a threaded shaft 41*s* and the nut 41*n* operable via balls (not shown). The threaded shaft 41*s* may be rotated on an axis along the X2-axis direction to move the nut 41*n* in the X2-axis direction. The X2-axis motor M21 may be a servo motor mounted on the Z2-axis direction slide table 42 to rotate the threaded shaft 41*s* in response to a command from the NC apparatus 3. The X2-axis direction slide table 41 and the tool post 20 mounted thereon may be driven in the X2-axis direction by the ball screw 41*b*.

The Z2-axis direction slide table 42 may have a pair of guides 42*g* slidably engaged in the Z2-axis direction with a pair of rails 42*r* mounted on the bed 2. The Z2-axis direction slide table 42 may further have a nut 42*n* detachably mounted thereon. The ball screw 42*b* is a mechanical component comprising a threaded shaft 42*s* and the nut 42*n* operable via balls (not shown). The threaded shaft 42*s* may be rotated on an axis along the Z2-axis direction to move the nut 42*n* in the Z2-axis direction. The Z2-axis motor M22 may be a servo motor mounted on the bed 2 to rotate the threaded shaft 42*s* in response to a command from the NC apparatus 3. The Z2-axis direction slide table 42 and the tool post 20 mounted thereon may be driven in the Z2-axis direction by the ball screw 42*b*. The X2-axis driving element may be moved in the Z2-axis direction by the Z2-axis driving element. The Z2-axis driving element may be moved in the X2-axis direction by the X2-axis driving element.

The combination of the guides and the rails may be replaced by a dove and a dovetail.

The combination of the base and the moving unit of the invention may be varied according to relative position of the units. The X1-axis direction slide table 31 on which the headstock 10 is mounted may be the moving unit and accordingly the Z1-axis direction slide table 32 may be the base. The Z1-axis direction slide table 32 may be the moving unit and accordingly the bed 2 may be the base. The X2-axis direction slide table 41 on which the tool post 20 is mounted may be the moving unit and accordingly the Z2-axis direction slide table 42 may be the base. The Z2-axis direction slide table 42 may be the moving unit and accordingly the bed 2 may be the base.

Figure 3:
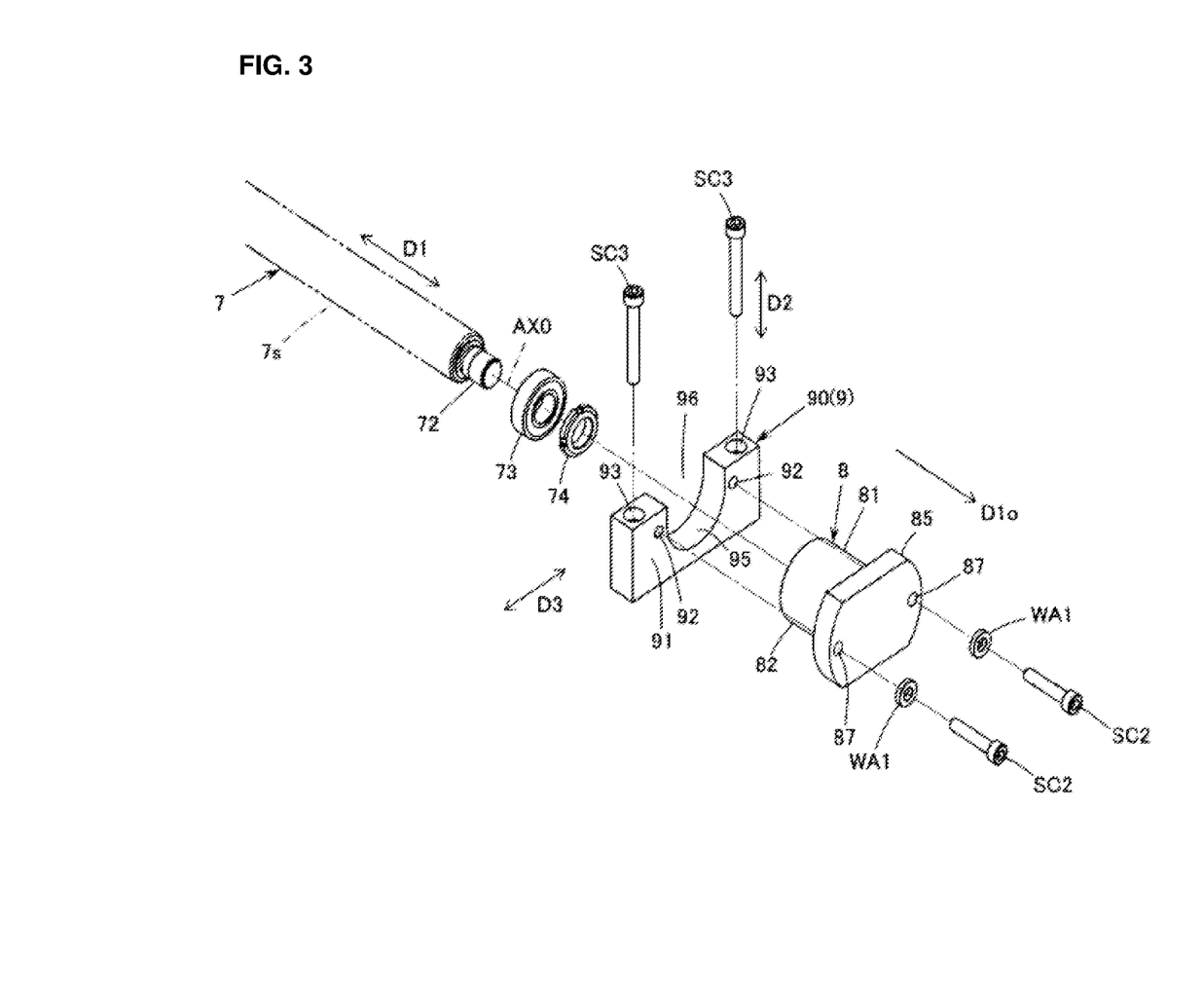
FIG. 3 is an exploded perspective view of an example of the end and therearound of the ball screw.
Figure 4:
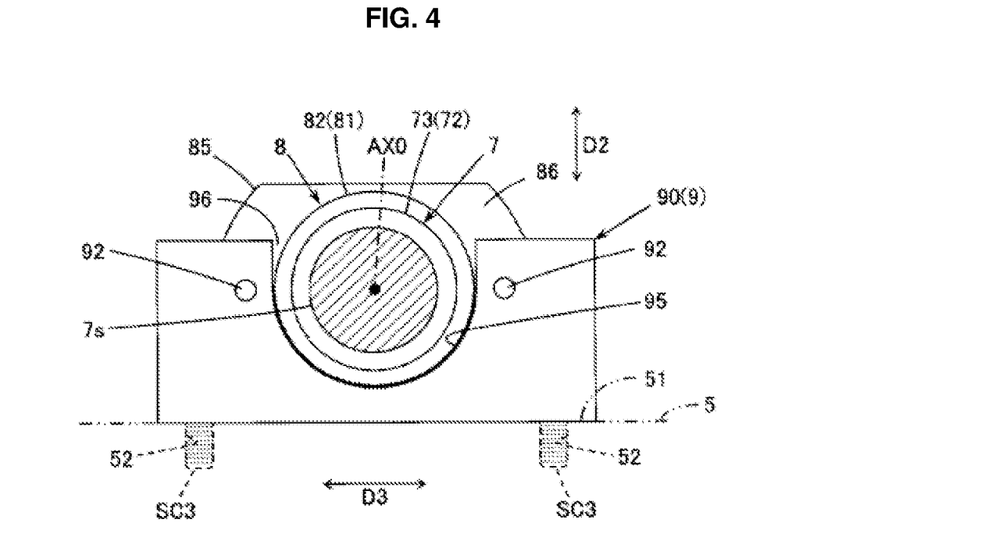
FIG. 4 is a vertical section view of an example of the end and therearound of the ball screw taken line A1 of FIG. 2.
Figure 5:
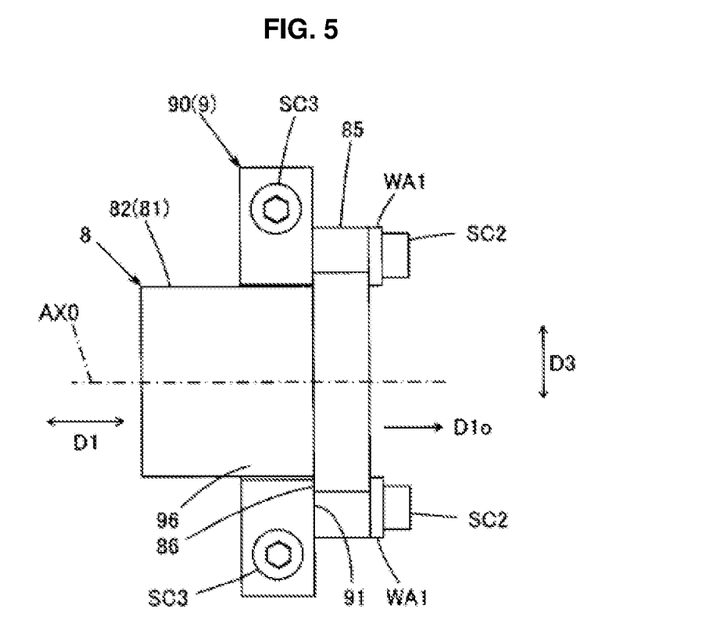
FIG. 5 is a plan view of the end and therearound of the ball screw seen from the opening side of the recess part of the supporting unit.

FIG. 2A, FIG. 2B, FIG. 2C, and FIG. 2D each schematically shows an example of replacement of a ball screw in a machine tool comprising the base 5, the moving unit 6, the ball screw 7, the cap 8, and the supporting unit 9. FIG. 3 is an exploded perspective view of an example of the end 72 and therearound of the ball screw 7. FIG. 4 is a vertical section view of an example of the end 72 and therearound of the ball screw 7 taken line A1 of FIG. 2. FIG. 5 is a plan view of the end 72 and therearound of the ball screw 7 seen from the side of the opening 96 of the recess part 95 of the supporting unit 9. The base 5 may correspond to any of the bed 2, the Z1-axis direction slide table 32, and the Z2-axis direction slide table 42. The moving unit may correspond to any of the X1-axis direction slide table 31 on which the headstock 10 is mounted, the Z1-axis direction slide table 32 on which the X1-axis direction slide table 31 is mounted, the X2-axis direction slide table 41 on which the tool post 20 is mounted, and the Z2-axis direction slide table 42 on which the X2-axis direction slide table 41 is mounted. The ball screw 7 may correspond to any of the ball screws 31*b*, 32*b*, 41*b*, and 42*b*. Accordingly, the nut 7*n* may correspond to any of the nuts 31*n*, 32*n*, 41*n*, and 42*n* and the threaded shaft 7*s* may correspond to any of the threaded shafts 31*s*, 32*s*, 41*s*, and 42*s*. The servo motor M0 mounted on the base 5 may be correspond to any of the motors M11, M12, M21, and M22.

Figure 2A:
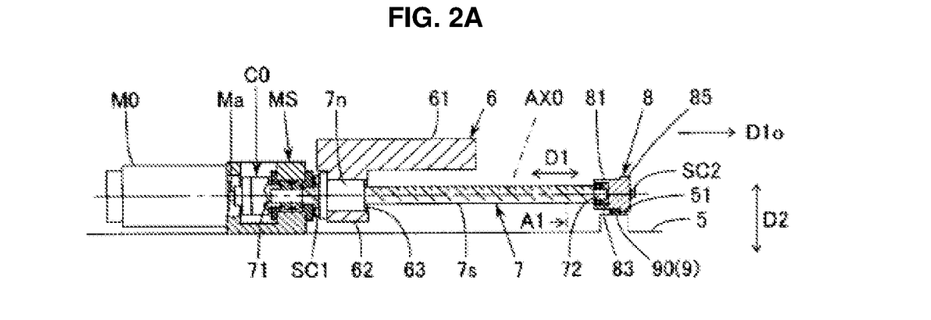
FIG. 2A, FIG. 2B, FIG. 2C, and FIG. 2D each schematically shows an example of replacement of a ball screw.

The base 5 may comprise a mounting portion 51 where a support 90 as an example of the supporting unit 9 may be mounted with a plurality of screws SC3 as shown in FIG. 2A and FIG. 4. The mounting portion 51 has a threaded hole 52 to be engaged with the screw SC3.

The moving unit 6 may be provided with respect to the base 5 movably in a predetermined axis direction D1 as shown in FIG. 2A to FIG. 2D. The axis direction D1 may be along the axis AX0 of the threaded shaft 7*s* of the ball screw 7. The moving unit 6 may comprise a body 61 and a bracket 62 having a through-hole 63 for receiving the nut 7*n* of the ball screw 7. The bracket 62 extended below the body 61 may protrude toward the threaded shaft 7*s*. The through-hole 63 may penetrate the bracket 62 in the axis direction D1. The nut 7*n* may be inserted into the through-hole 63 to be fastened to the bracket 62 with a screw SC1. The moving unit 6 and the nut 7*n* fixed thereto may be thereby moved in the axis direction D1 bidirectionally.

The ball screw 7 may comprise the nut 7*n* and the threaded shaft 7*s* engaged to each other via balls (not shown). The threaded shaft 7*s* may be rotated on the axis AX0 along the axis direction D1 to move the nut 7*n* fixed to the moving unit 6 in the axis direction D1. One end 71 of the threaded shaft 7*s* may be connected to the motor M0 via a coupling C0 of a torque transmission mechanism in a motor support MS. The other end 72 of the threaded shaft 7*s* may be engaged with a roller bearing 73 fastened thereto with a lock nut 74. The other end 72 of the threaded shaft 7*s* may be then inserted into a recess part 83 of the body 81 of the cap 8 to be positioned by the support 90 and the cap 8. The bearing 73 may include a ball bearing and a roller bearing.

The coupling C0 may be used to couple the end 71 of the threaded shaft 7*s* with a motor shaft Ma of the motor M0. The coupling C0 may be rotated on the axis AX0 to rotate the threaded shaft 7*s* when the motor shaft Ma is rotated. The coupling C0 may be a locking element having a hub to be coupled with a shaft (the motor shaft Ma or the end 71) by tightening a screw. The locking element may be a wedge-shaped friction coupling element that couples the shaft with the hub by an increase in friction therebetween by tightening the screw in the axis direction. The motor M0 may be supported by the motor support MS on the base 5 to drive the threaded shaft 7*s* via the coupling C0 in response to a command from the NC apparatus 3. The moving unit 6 and the nut 7*n* fixed thereto may be moved in the axis direction D1 by the ball screw 7.

The cap 8 may comprise the body 81 and the flange 85 as shown in FIG. 3 to FIG. 5. The body 81 may be received in the recess part 95 of the support 90. The flange 85 may be expanded larger than the body 81 on the outer side D1*o* thereof in the axis direction D1 and thereby not be received in the recess part 95. The body 81 may have the recess part 83 circular in cross section where the end 72 of the threaded shaft 7s engaged with the bearing 73 is inserted. The body 81 of the cap 8 may cover the end 72 of the threaded shaft 7s and thereby allows rotation of the threaded shaft 7s on the axis AX0. An outer side 82 of the body 81 may be formed circular in a side view and smaller than the curved surface of the recess part 95 of the support 90. There may therefore exist some clearance between the body 81 and the recess part 95, which facilitates the position adjustment of the ball screw 7 in the direction perpendicular to the axis direction D1 (the direction D2 as shown in FIGS. 3 and 4 and a direction D3 perpendicular to D1 and D2) in the state that the posture of the ball screw 7 has been defined by engagement of the flange 85 of the cap 8 with the positioning part 91 of the support 90. The flange 85 may be expanded from the body 81 in a diameter direction with respect to the axis AX0. The flange 85 may have a screw insertion hole 87 through which a plurality of screws SC2 each is inserted in the axis direction D1. An inner surface 86 of the flange 85 may be in contact with the positioning part 91 of the support 90. The diameter of the screw insertion hole 87 may be greater than the diameter of the screw SC2 to facilitate the position adjustment of the ball screw 7 in the state that the posture of the ball screw 7 has been defined. The cap 8 may be then fastened with the screws SC2. The recess part 83 may invade the flange 85.

The support 90 may comprise a threaded hole 92 to be engaged with the screw SC2, a screw insertion hole 93 through which a plurality of screws SC3 each is passed, the recess part 95 which receives the body 81 of the cap 8, and the planar positioning part 91 on which the inner surface 86 of the flange 85 abuts. As shown in FIG. 3 the screw SC2 may be passed through a washer WA1 and the screw insertion hole 87 to be finally engaged with the threaded hole 92. The screw insertion hole 93 may penetrate in the direction D2 perpendicular to the axis direction D1. The diameter of the screw insertion hole 93 may be set greater than the diameter of the screw SC3 to fasten the support 90 with the screw SC3 by using the positioning part 91 as a vertical surface defining the posture of the ball screw 7. The positioning part 91 may be set as the vertical surface and then the screw SC3 may be passed through the screw insertion hole 93 to be finally engaged with the threaded hole 52 of the mounting portion 51 of the base 5. The support 90 may be thereby fastened on the mounting portion 51 to support the cap 8. The recess part 95 of the support 90 may be almost U-shaped. The recess part 95 may have the opening 96 allowing the threaded shaft 7s to pass in the direction D2 perpendicular to the axis direction D1 in the state that the support 90 is fastened to the mounting portion 51. The recess part 95 may receive the body 81 of the cap 8. The curved surface of the recess part 95 may be greater than the outer side 82 of the body 81. The opening 96 may face the opposite side to the base 5. The opening 96 thereby allows the threaded shaft 7s to pass in the direction D2 perpendicular to the axis direction D1 in the state that the support 90 is fastened to the mounting portion 51. The positioning part 91 may be a surface of the support 90 on the outer side with respect to the axis direction D1 where the inner surface 86 of the flange 85 abuts in the axis direction D1 in the state that the body 81 is received in the recess part 95.

(3) Embodiment of Replacing the Ball Screw

Figure 2B:
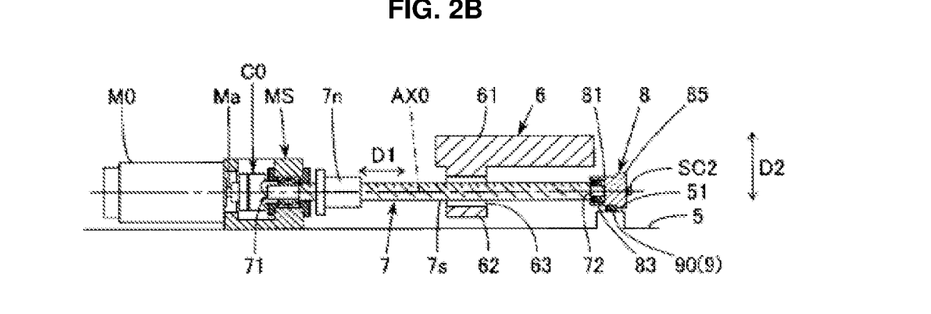
Figure 2C:
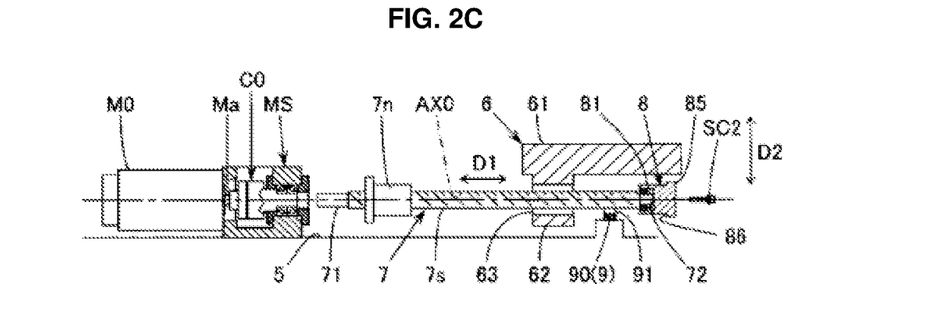

Replacing the ball screw is being described referring to FIG. 2A to FIG. 2D. First, removing the ball screw 7 from the machine tool of FIG. 2A is being described. The screw SC1 may be removed from the bracket 62 of the moving unit 6 to release the bracket 62 from the nut 7n. The moving unit 6 may be thereby moved toward the support 90 on the rail (not shown) as shown in FIG. 2B. The screw fastening the end 71 of the threaded shaft 7s with the coupling C0 may be loosened and the screw SC2 near the other end 72 of the threaded shaft 7s may be removed to release the support 90 from the cap 8. The end 71 of the threaded shaft 7s may be then pulled out of the coupling C0 and the ball screw 7 together with the cap 8 may be partially drawn outwards D1o in the axis direction D1 as shown in FIG. 2C. The ball screw 7 cannot be fully drawn outwards D1o in the axis direction D1 since the threaded shaft 7s penetrates through the bracket 62 between the nut 7n and the cap 8. The ball screw 7 cannot be drawn out on the side of the end 71 of the threaded shaft 7 without tilting the threaded shaft 7s since there exist large structures on the base 5 such as the motor M0 and the motor support MS.

Figure 2D:
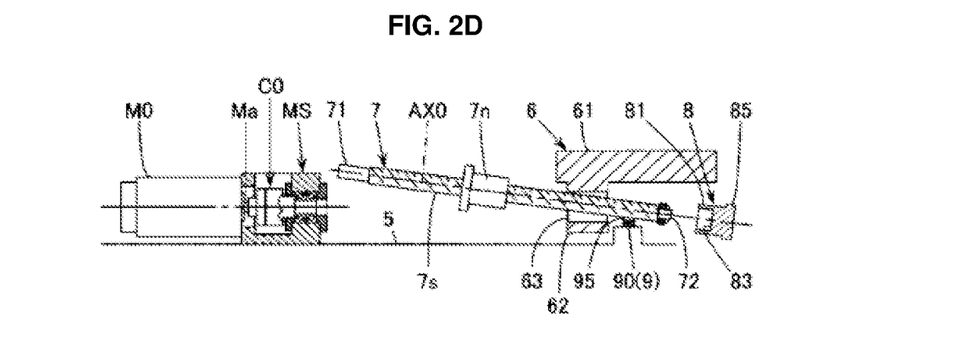

The recess part 95 of the support 90 may have the opening 96 for passing the threaded shaft 7s in the direction D2 perpendicular to the axis direction D1 in the state that the support 90 is provided on the base 5. As shown in FIG. 2D, the end 71 of the threaded shaft 7s may be readily lifted upwards away from the base 5 by tilting the threaded shaft 7s toward the opening 96. The cap 8 may be removed from the other end 72 of the threaded shaft 7s. The other end 72 of the threaded shaft 7s may be then pulled out from the through-hole 63 of the bracket 62 to fully draw out the ball screw 7 toward the motor M0 side. As described above, the ball screw 7 can be fully drawn out without the need of removing the support 90 from the base 5 only by readily tilting the threaded shaft 7s toward the opening 96 of the recess part 95.

Setting the ball screw 7 in the machine tool is being described. The removing procedure as described above may be reversed. As shown in FIG. 2D, the end 71 of the threaded shaft 7s may be tilted upwards and the other end 72 may be inserted into the through-hole 63 of the bracket 62. There is no need of removing the support 90 from the base 5 since the recess part 95 of the support 90 has the opening 96 on the side the threaded shaft 7s is tilted in the state that the support 90 is mounted on the base 5. Then as shown in FIG. 2C, the cap 8 may be put on the end 72 of the threaded shaft 7s, the end 71 of the threaded shaft 7s may be inserted into the coupling C0, and the body 81 of the cap 8 may be put in the recess part 95 of the support 90. The positioning part 91 of the support 90 remains the vertical surface since the support 90 is kept mounted on the base 5. Bringing the inner surface 86 of the flange 85 against the positioning part 91 of the support 90 may define the posture of the ball screw 7. The position of the ball screw 7 in the direction (D2 or D3 in FIG. 3 and FIG. 4) perpendicular to the axis direction D1 may be adjusted and the cap 8 may be fastened with the screw SC2. Setting the ball screw 7 may be thereby completed.

In a conventional machine where the support does not have the opening, the operator cannot tilt the ball screw since the threaded shaft interferes with the support mounted on the base. There is therefore need of removing the support from the base to replace the ball screw. The operator, however, needs a skill and an experience to check and adjust the posture of the ball screw in the replacement process that the end of a new ball screw is inserted in the coupling and the support is finally fastened to the base. Posture adjustment includes parallelism adjustment of the axially movable threaded shaft by using a pick tester.

In the embodiment, there is no need of removing the support from the base to replace the ball screw. The operator needs no skill and experience to adjust the posture of the ball screw. The posture of the ball screw can be defined only by bringing the flange of the cap against the positioning surface of the support. The operator is only required to slightly adjust the ball screw in position before fastening the cap to the support. Accordingly, the embodiment facilitates the replacement of the ball screw regardless of skill and experience of the operator. As shown in FIG. 4, the recess part 95 of the support 90 has the opening 96 and the support therefore does not necessarily enclose the threaded shaft 7s. A higher support is no more necessary. The embodiment provides a compact supporting unit.

(4) Modifications

The invention may be embodied in a variety of modifications. The lathe, for example, may comprise a lathe of sliding headstock type and a lathe of stationary headstock type. The supporting unit 9 may be integrally formed with the base 5. The opening 96 of the recess part 95 of the supporting unit 9 may face the opposite side to the base 5 but not limited thereto. The opening 96 may face the horizontal direction perpendicular to the axis direction D1 or the direction along the base 5. Replacement of the ball screw is available without removing the supporting unit from the base only by tilting the threaded shaft toward the opening. The opening may face any direction deviated from the vertical or horizontal directions as far as the threaded shaft can pass therethrough.

Figure 6:
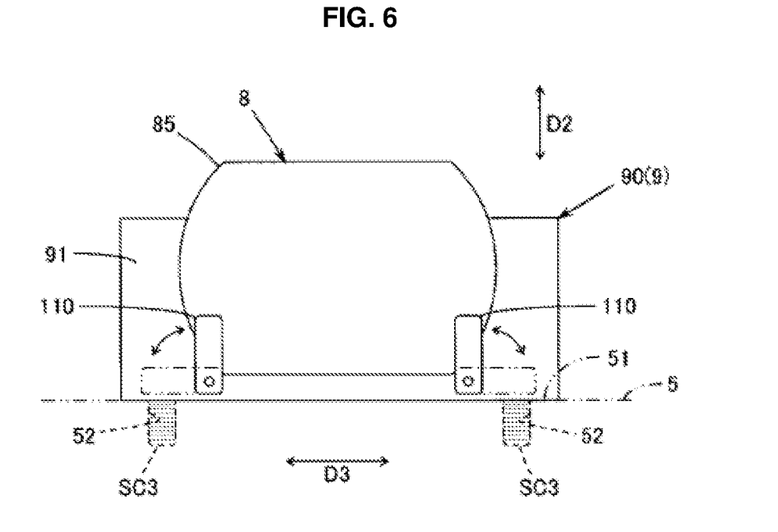
FIG. 6 is a side view of another example of the cap put on the supporting unit as seen from the flange side

The cap 8 may be fastened to the supporting unit 9 with the screw SC2 but not limited thereto. It may be fastened with anything else such as a case or a claw as shown in FIG. 6. FIG. 6 is a side view of another example of the cap put on the supporting unit as seen from the flange side. The support 90 may have a plurality of pivotable claws 110. The claw 110 may hold the flange 85 against the positioning part 91 when raised as shown in a solid line and release the flange 85 when lowered as shown in a two-dot chain line. The posture of the ball screw can be defined only by bringing the flange of the cap against the positioning surface of the support in the axis direction D1.

Figure 7:
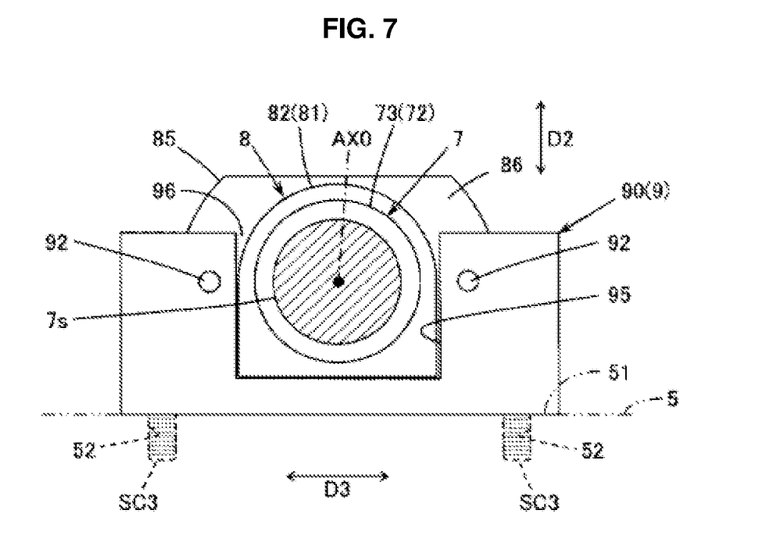
FIG. 7 is a vertical section view of another example of the end and therearound of the ball screw taken line A1 of FIG. 2.

The outer side of the body of the cap may be circular in section but not limited thereto. The recess part of the supporting unit may be of any shape. FIG. 7 is a vertical section view of another example of the end and therearound of the ball screw taken line A1 of FIG. 2. The recess part 95 of the support 90 is rectangular in a side view. The under side of the outer side 82 of the body 81 of the cap 8 may be of a shape matching with the rectangular recess part 95. The posture of the ball screw can be defined only by bringing the flange of the cap against the positioning surface of the support in the axis direction D1.

(5) Conclusion

As described above, the invention provides a lathe capable of facilitating the replacement of the ball screw in a variety of embodiments. The essential operations and effects of the invention may be available even from only the elements of independent claims. The elements disclosed in the embodiments may be mutually replaced or the combination thereof may be changed. The disclosed elements may be mutually replaced by prior art of the combination thereof may be changed. Such replacement and change may be within the scope of the invention.

What is claimed is:
1. A machine tool, comprising:
a base,
a slide table provided with respect to the base movably in a predetermined axis direction,
a ball screw having a nut fixed to the slide table and a threaded shaft rotated on an axis along the axis direction to move the nut in the axis direction,
a cap which comprises a body having a blind hole extending into the body and a flange expanded larger than the body on an outer side with respect to the axis direction, covers a first distal end of the threaded shaft by receiving the first distal end within the blind hole, and allows rotation of the threaded shaft on the axis,
a cap support provided on the base,
a torque transmission mechanism coupled to a second distal end of the threaded shaft which is opposite to the first distal end, and
a motor disposed on a side of the second distal end and configured to rotate the threaded shaft via the torque transmission mechanism,
wherein the cap support comprises a recess part which receives the body of the cap, the recess part being provided with an opening facing an opposite side to the base to allow the threaded shaft to pass in a direction perpendicular to the axis direction in a state that the cap support is provided on the base, and
the cap support further comprises a positioning surface on which an inner surface of the flange abuts in the axis direction in a state that the body of the cap is received in the recess part.

* * * * *